April 3, 1928.                                                                                    1,664,958
E. A. ZEISER
INFANT'S AUTO CARRIER
Filed Feb. 9, 1925
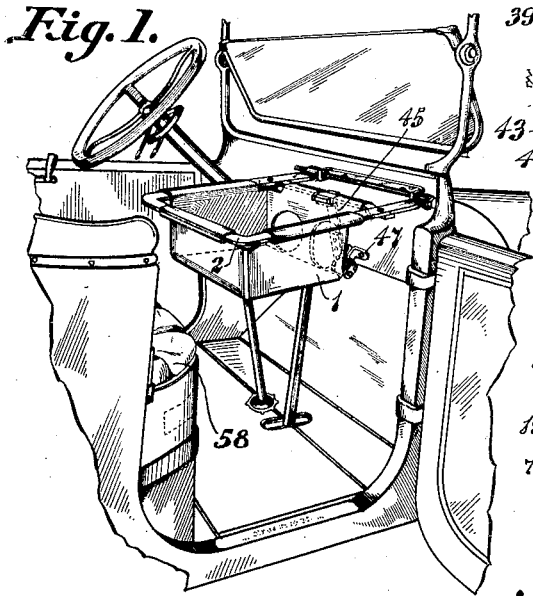
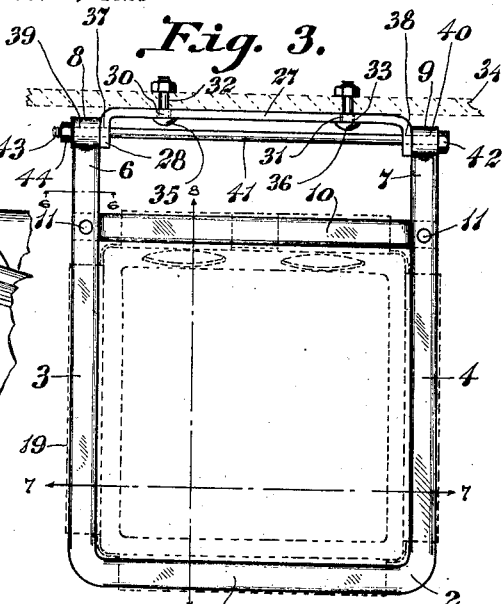
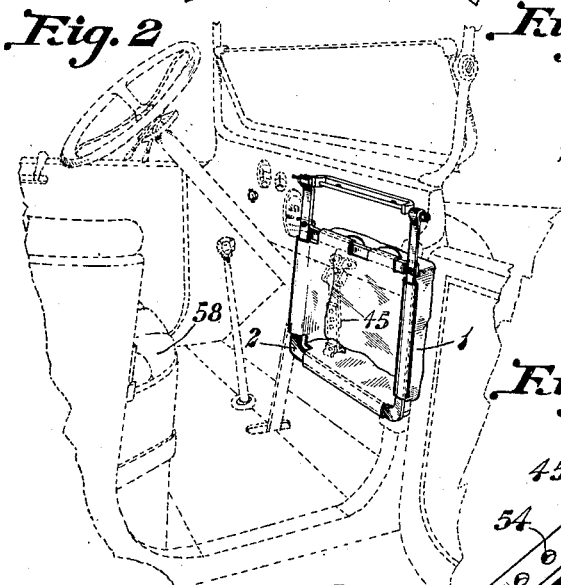
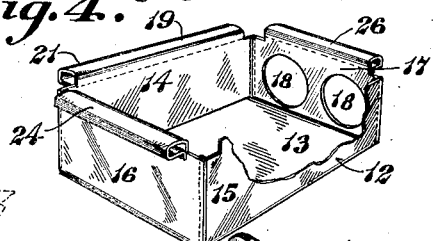
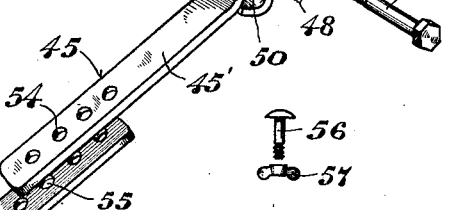
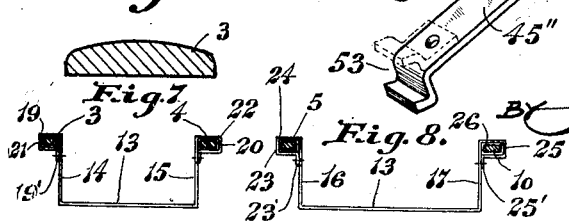
INVENTOR
Earl A. Zeiser
BY James N. Ramsey
ATTORNEY Patented Apr. 3, 1928.

1,664,958

UNITED STATES PATENT OFFICE.

EARL A. ZEISER, OF CINCINNATI, OHIO.

INFANT'S AUTO CARRIER.

Application filed February 9, 1925. Serial No. 7,838.

My invention relates to an attachment for vehicles, and more particularly automobiles, in the form of an auto seat for holding small children or infants.

The objects of my invention are to provide a simple, efficient, serviceable, convenient and an easily operated device for carrying infants in vehicles.

Another object of my invention is to provide a seat adapted to be attached to vehicles for carrying infants, which when not in use, can be quickly dispensed with, or when desired for use can be easily and quickly put into readiness for carrying an infant.

A further object of my invention is the production of a device of this character, which when in use will occupy a minimum amount of space and when not in use can be dropped down or collapsed so as to be out of the way.

A still further object of my invention is to so construct a device of this character which may be installed on a dash board of an automobile, as well as in the rear compartment.

Heretofore it has been customary to install infants' seats on the rear of the front seat. This construction is not capable of being used in a roadster or coupé, whereas my invention can be placed in a location convenient for the driver of the car.

My invention consists in a child's seat for vehicles comprising a seat frame pivoted to a supporting member by means of a rod and having the seat portion constructed of goods, such as canvas, leather, cloth or similar flexible or pliable material having a secondary supporting member adapted to support the seat frame when it is desired to use it for carrying purposes.

My invention further consists in the construction, combination, location and arrangement of parts, as herein set forth and claimed.

In the drawings:

Fig. 1 is a perspective view showing the invention in carrying position attached to the dash of an automobile;

Fig. 2 is a similar view but with the device shown in a collapsed or inoperative position;

Fig. 3 is a plan view of the device, omitting the seat frame and supporting member, and showing the seat and dash in dotted lines;

Fig. 4 is a perspective view of the seat, one side being broken away to clearly show the openings for the legs of the child;

Fig. 5 is a disassembled perspective view of the seat frame support;

Fig. 6 is a transverse section taken on a line corresponding to 6—6 in Fig. 3;

Fig. 7 is a transverse section taken on a plane corresponding to line 7—7 of Fig. 3; and Fig. 8 is a similar section taken on a plane corresponding to line 8—8 of Fig. 3.

In the embodiment of my invention, as illustrated, and which shows a preferred construction, I provide an infant's carrier 1 comprising U-shaped frame 2 having sides 3 and 4, respectively, and end 5 integral therewith. Ends 6 and 7, respectively, of sides 3 and 4 are formed into eyes 8 and 9. Transverse connecting strip 10 is located near ends 6 and 7, respectively, and is securely fastened to sides 3 and 4 by any suitable means, as for instance, by rivets 11. Seat 12 is made of flexible material such as canvas or leather and comprises bottom 13, sides 14 and 15 and ends 16 and 17. End 17 is provided with holes 18 for the purpose of receiving a child's legs when sitting in the carrier.

The sides 14 and 15, respectively, are provided with integral extensions 19 and 20, respectively. Integral extension 19 of side 14 is adapted to be folded over side 3 of U-shaped frame 2 and has its longitudinal edge 19' sewn to side 14, thereby forming sleeve 21. Integral extension 20 of side 15 is adapted to be folded over side 4 of U-shaped frame 2 and its outer longitudinal edge is sewn to side 15 thereby forming sleeve 22. End 16 is provided with integral extension 23 which is adapted to be folded over end 5 of U-shaped frame 2 and its outer longitudinal edge 23' is sewn to end 16, thereby forming sleeve 24. End 17 is provided with integral extension 25 which is adapted to be folded over transverse connecting strip 10 and has its outer longitudinal edge 25' sewn to end 17, thereby forming sleeve 26. The sides 14 and 15, respectively, may be secured to the ends 16 and 17, respectively, by any suitable means such as stitching. It may clearly be seen that by this construction seat 12 is securely fastened together and supported by U-shaped frame 2.

To support the U-shaped frame 2, I provide bracket 27 having ends 28 and 29, respectively, bent at right angles thereto and having holes 30 and 31, respectively, which aline with holes 32 and 33 in the dash board 34 for the purpose of receiving bolts 35 and 36 which securely fasten the bracket to the dash board. Ends 28 and 29, respectively, are provided with holes 37 and 38 which aline with holes 39 and 40 in eyes 8 and 9 of U-shaped frame 2 for the purpose of receiving rod 41. The rod 41 has integral head 42 on one end thereof and is provided with threads 43 on the other end to receive nut 44 whereby the U-shaped frame 2 is securely held in pivoted relation to bracket 27. It may be seen that by this construction the U-shaped frame 2 is adapted to pivot on rod 41 whereby the seat may be supported, as shown in Fig. 1, or dropped or collapsed, as shown in Fig. 2. To support the seat, as shown in Fig. 1, I provide support, brace or arm 45 comprising forked bracket 46 adapted to be secured to the dash board in any suitable manner, such as for instance, by bolts 47 and having holes 48 in the spaced apart end portions of the forked ends 49. Support 45 is adjustable and comprises lower half 45' having one end formed into eye 50 which is adapted to fit between the forked ends 49 of bracket 46 and held in pivoted relation thereto by bolt 51. The upper half 45'' of support 45 has its free end bent so as to form a double right angle bend and has an auxiliary part 52 secured thereto and provided with an oppositely disposed double right angle bend forming fork 53 which is adapted to receive the underside of transverse connecting strip 10, as shown in Fig. 1 for the purpose of supporting the U-shaped frame 2. Holes 54 in the lower half 45' of support 45 and holes 55 in the upper part of said support are for the purpose of receiving a plurality of bolts 56, said bolts being provided with wing-nuts 57. When it is desired to lengthen or shorten said support 45, unscrew wing-nuts 57 and remove bolts 56 from within holes 54 and 55, respectively, whereupon the relation of the holes 54 and 55 may be changed and bolt 56 inserted again, thereby shortening or lengthening support 45.

It will be understood that I do not wish to limit the scope of my invention to the specific construction shown in the drawing, but the construction shown is the one I prefer to effect storage of the device in a minimum amount of space and also one which will not interfere with persons occupying the vehicle seat to the rear of the device.

It will also be understood that my invention resides in the combination, arrangement and location of parts and in the details of construction, as herein claimed, and that changes in the precise embodiment of the invention can be made within the scope of what is claimed without departing from the spirit of the invention.

What I claim as new and desire to secure by Letters Patent is:

In an infant's carrier for automobiles, a seat frame preferably U-shaped, the ends of which are formed into eyes or bearings, a frame bracket adapted to be fastened to the dash board of an automobile and having its ends extending at right angles thereto for the purpose of receiving a rod upon which the seat frame is capable of pivoting, means for retaining said rod in said bracket and seat frame, a rectangular seat adapted to be supported by said seat frame and having a plurality of openings in one end thereof, a horizontal frame connecting the seat frame near its end, means for supporting said seat and seat frame in horizontal position or a position capable of holding an infant, said supporting means being adjustable and pivotally mounted on said dash board and capable of being moved, substantially as set forth and for the purposes specified.

EARL A. ZEISER.